(12) United States Patent
Khavari

(10) Patent No.: US 7,700,175 B2
(45) Date of Patent: Apr. 20, 2010

(54) STORAGE DISC

(75) Inventor: Mehrgan E. Khavari, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 812 days.

(21) Appl. No.: 11/518,801

(22) Filed: Sep. 11, 2006

(65) Prior Publication Data

US 2008/0063899 A1 Mar. 13, 2008

(51) Int. Cl.
*B32B 3/02* (2006.01)

(52) U.S. Cl. .................. 428/64.1; 428/64.4; 430/270.1

(58) Field of Classification Search .................. None
See application file for complete search history.

(56) References Cited

U.S. PATENT DOCUMENTS

| | | | |
|---|---|---|---|
| 5,317,337 A | 5/1994 | Ewaldt | |
| 5,518,325 A | 5/1996 | Kahle | |
| 5,616,447 A | 4/1997 | Arioka | |
| 6,042,919 A | 3/2000 | Gorsuch | |
| 6,074,031 A | 6/2000 | Kahle | |
| 6,109,324 A | 8/2000 | Bugner et al. | |
| 6,447,869 B2 * | 9/2002 | Ohno et al. | 428/64.1 |
| 6,501,718 B1 | 12/2002 | Ono et al. | |
| 6,534,142 B1 | 3/2003 | Hummell et al. | |
| 6,778,205 B2 | 8/2004 | Anderson et al. | |
| 2002/0048241 A1 | 4/2002 | Kumagai et al. | |
| 2002/0191517 A1 * | 12/2002 | Honda et al. | 369/53.29 |
| 2003/0107959 A1 | 6/2003 | Norton et al. | |
| 2003/0108708 A1 | 6/2003 | Anderson et al. | |
| 2003/0161224 A1 | 8/2003 | Anderson et al. | |
| 2003/0194214 A1 | 10/2003 | Anderson et al. | |
| 2004/0037176 A1 | 2/2004 | Morishima | |
| 2004/0141445 A1 | 7/2004 | Hanks | |
| 2004/0146001 A1 | 7/2004 | Koll et al. | |
| 2005/0270928 A1 | 12/2005 | Sugahara et al. | |
| 2005/0276189 A1 | 12/2005 | Koll et al. | |
| 2005/0281181 A1 | 12/2005 | Honda | |
| 2006/0121234 A1 | 6/2006 | Field | |

FOREIGN PATENT DOCUMENTS

| | | |
|---|---|---|
| EP | 0918323 | 5/1999 |
| EP | 1363279 | 11/2003 |
| EP | 1562196 | 8/2005 |
| JP | 09-123606 | 5/1997 |
| JP | 09-123607 | 5/1997 |
| JP | 09-265760 | 10/1997 |
| JP | 09-306144 | 11/1997 |
| JP | 10-320963 | 4/1998 |
| JP | 11-003543 | 1/1999 |
| JP | 2000-155989 | 6/2000 |
| JP | 2000-173096 | 6/2000 |
| JP | 2000-173238 | 6/2000 |
| JP | 2002-216396 | 8/2002 |

OTHER PUBLICATIONS

International Search Report for PCT/US2007/078142; filed Sep. 11, 2007; Hewlett-Packard Development Co. Ltd.; Report issued Apr. 24, 2008.

* cited by examiner

*Primary Examiner*—Elizabeth Mulvaney

(57) ABSTRACT

Various embodiments and methods relating to a storage disc having writable layer, a reflective layer and a compressive layer are disclosed.

21 Claims, 3 Drawing Sheets

STORAGE DISC

BACKGROUND

Providing storage discs with an appropriate radial tilt to facilitate reading and writing by a laser may make fabrication of such discs difficult.

DETAILED DESCRIPTION OF THE EXAMPLE EMBODIMENTS

Figure 1:
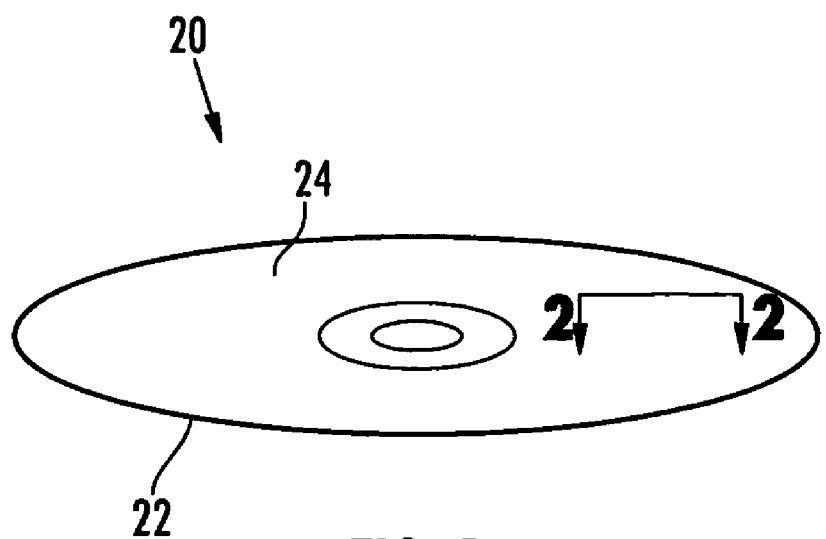
FIG. 1 is a top perspective view of one example of a storage disc according to an example embodiment.

FIG. 1 illustrates one example of a storage disc 20 according to an example embodiment. Disc 20 comprises an optical storage medium configured to store data. Disc 20 is configured to be rotatably driven to facilitate retrieval of data from disc 20 using a laser. For purposes of this disclosure, the term "data" shall mean information that is encoded so as to be machine or computer-readable. For example, information may be digitally encoded with binary bits or values. Such data may have different formats such as various presently or future created music, photo and document formats. Such data is upon disc 20. Although the existence of the data on the disc may, in some embodiments, be visually seen by the human eye as darker or lighter rings on the disc, the content or information encoded by the data is generally not readable by a human eye. In other words, the darker or lighter rings that may be viewed on the disc do not communicate information to a person viewing the rings and do not identify or label characteristics of the data.

Disc 20 is further configured to have one or more labels written upon it. For purposes of this disclosure, the term "label" shall mean any image, graphic, photo, drawing, picture, alphanumeric symbols, design and the like that are visible to a human eye. Such labeling may directly communicate information regarding the content or characteristic of the data on disc 20 to a person. Such labeling may also alternatively visually communicate other unencoded information to a person.

In one embodiment, disc 20 comprises an optical disc. Disc 20 includes both data storage portions and label portions. In one embodiment, data storage portions are located on a first side 22 of disc 20 and label portions are located on a second opposite side 24 of disc 20. For purposes of this disclosure, when discussing the disc, the term "side" refers to the general side from which the data or label may be read or otherwise accessed and not the relative positioning of a layer of material or the positioning of the data or label with respect to a plane bisecting a thickness of the disc. For example, in some embodiments, label markings on disc 20 may be viewed or accessed from side 22 of disc 20 although being on the opposite side of the plane bisecting sides 22 and 24, thus being physically closer to side 22.

Figure 2:
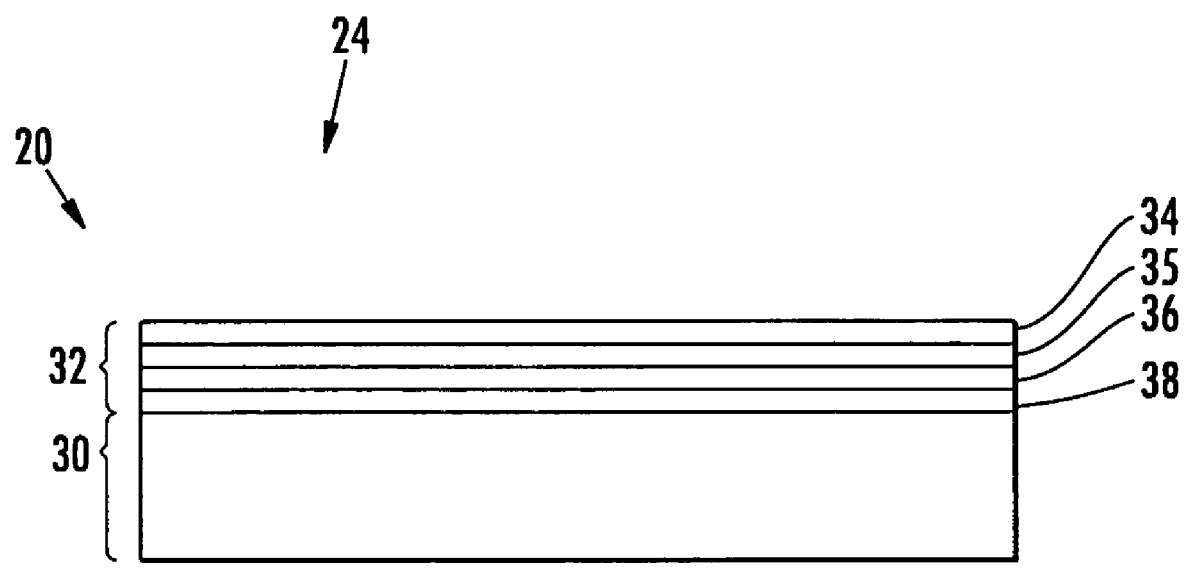
FIG. 2 is a sectional view of the storage disc of FIG. 1 taken along line 2-2 according to an example embodiment.

FIG. 2 illustrates disc 20 in more detail. FIG. 2 is a sectional view of the disc 20 of FIG. 1 taken along line 2-2. As shown by FIG. 2, disc 20 includes data portion 30 and a label portion 32. Data portion 30 comprises that portion of disc 20 configured to store and facilitate reading of data on disc 20. In one embodiment, data portion 30 is configured to reflect light (such as visible light, ultraviolet light or infrared light) differently from different areas depending upon the data stored or encoded on data portion 30. In one embodiment, such light being reflected by portion 30 may be provided by a source of coherent light such as a laser.

In one embodiment, data portion 30 is writable such that an end-user may write data to portion 30 for later retrieval or reading. In particular embodiments, data portion 30 may be rewritten upon multiple times. Examples of a writable data portion 30 include, but are not limited to, writeable and rewriteable compact discs (CD+/−R, CD+/−RW), writeable and rewritable digital versatile discs (DVD+/−R, DVD+/−RW), Blu-Ray discs and the like.

In other embodiments, data portion 30 may be preconfigured or fabricated with grooves or pits representing a fixed set of data. Examples of data portion 30 which is preconfigured include, but are not limited to, discs that are stamped or otherwise formed from masters. Such preconfigured data portions 30 include preconfigured CDs, DVDs, Blu-ray discs and the like.

Label portion 32 comprises one or more layers coupled to data portion 30 to facilitate writing of a label on disc 20 using a source of energy, such as a source of coherent light like a laser. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

In addition to facilitating the writing of a label to disc 20, label writing portion 32 is configured to be added to data portion 30 without deleteriously altering radial tilt of data portion 30 and of disc 20. Label portion 32 includes imageable or writable layer 34, protective layer 35, reflective layer 36 and compressive layer 38. Layer 34 comprises one or more layers of one or more materials configured to facilitate the writing of a label upon disc 20 with electromagnetic energy or light. In the particular example illustrated, layer 34 facilitates writing of a label using a laser. In one embodiment, layer 34 comprises one or more thermochromic materials configured to change optical properties (such as optical density) when subjected to energy such as infrared radiation, ultraviolet radiation or visible light.

For example, in one embodiment, such thermochromic materials may include a leuco dye which may change color with the application of heat or in the presence of an activator (developer). In one embodiment, the dye may include fluoran-based compounds. In some embodiments, writable layer 34 may additionally include a radiation-absorbing material to facilitate absorption of one or more wavelengths of marking radiation. Examples of such a radiation-absorbing material include an infrared dye. In one embodiment, writable layer 34 may be configured to change between a light translucent state and a darkened light-absorbing or light-attenuating state in response to being irradiated by energy such as from a laser. One example of such a material includes BK-400 or Black 400 commercially available from Nagase America Corporation, New York, N.Y. In other embodiments, writable layer 34 may alternatively include other materials.

Layer 35 comprises a relatively thin transparent layer configured to protect underlying layer 36 from environmental conditions such as moisture or humidity. In one embodiment, layer 35 may be formed from a CD lacquer such as Daicure SD2200 or SD2407 by Dainippon Ink or Desolite 650-020, 650-030, 650-031, or 650-033 from DSM Desotech. In other embodiments, layer 35 may refer from other materials. In still other embodiments, layer 35 may be omitted where layer 34 additionally protects reflective layer 36.

Reflective layer 36 comprises one or more layers of one or more materials having sufficient reflectivities so as to reflect visible light that has passed through writable layer 34 back towards a person viewing label side 24 of disc 20. In one embodiment, layer 36 comprises a layer of one of more metals which are highly reflective such as silver, aluminum or alloys thereof. In other embodiments, other reflective metals or nonmetals may be used. Layer 36 is in tension.

Compressive layer 38 comprises one or more layers of one or more materials coupled to layer 36 and configured to apply a compressive force to remaining portions of disc 20 upon substantially complete cure or solidification. Compressive layer 38 applies a compressive force that counters the tensile force resulting from the addition of layer 36. As a result, label portion 32 may be added to a storage disc including data portion 30, but lacking the ability to be written upon with a light source, without substantial adjustment or altering of the fabrication of data portion 30 while maintaining disc 20 within prescribed radial tilt specifications. In particular, the addition of reflective layer 36 may potentially apply sufficient tensile force to data portion 30 such the disc 20 is out of radial tilt specifications. Compressive layer 38 counters such tensile forces to once again bring disc 20 back into conformance. The addition of layer 38 to counter or lessen the tensile effect of layer 36 is a less complex and less complex solution as compared to prior art solutions.

In the particular example illustrated, layer 38 is formed directly adjacent to layer 36 such that the compressive force provided by layer 38 may more directly remove or counter the tensile force of layer 36. In one embodiment, layer 38 is adhered to layer 36. As a result, layer 38 more effectively counters the tension resulting from the addition of layer 36. In other embodiments, layer 38 may be separated from layers 36 by one or more intermediate layers, wherein the compressive force from layer 38 is transmitted through such intermediate layers to layer 36.

In one embodiment, layer 38 has a compressive stress sufficient to lower overall tension of disc 20 such that disc 20 has a radial tilt of less than or equal to about 0.7 degrees. In one embodiment, layer 36 has a tensile stress of a first magnitude and layer 38 has a compressive stress of a second magnitude differing from the first magnitude by less than or equal to about 100 Mpa. In other embodiments, layer 38 is at a compressive stress substantially equal to the tensile stress of layer 36. In one embodiment, layer 38 has a thickness of between about 50 Angstroms and about 600 Angstroms. One embodiment to layer 38 may be formed from one or more of Ta, Ti, Zirconium, $Al_2O_3$, $SiO_2$, $TiO_2$. In other embodiments, layer 38 may be formed from other materials.

Figure 3:
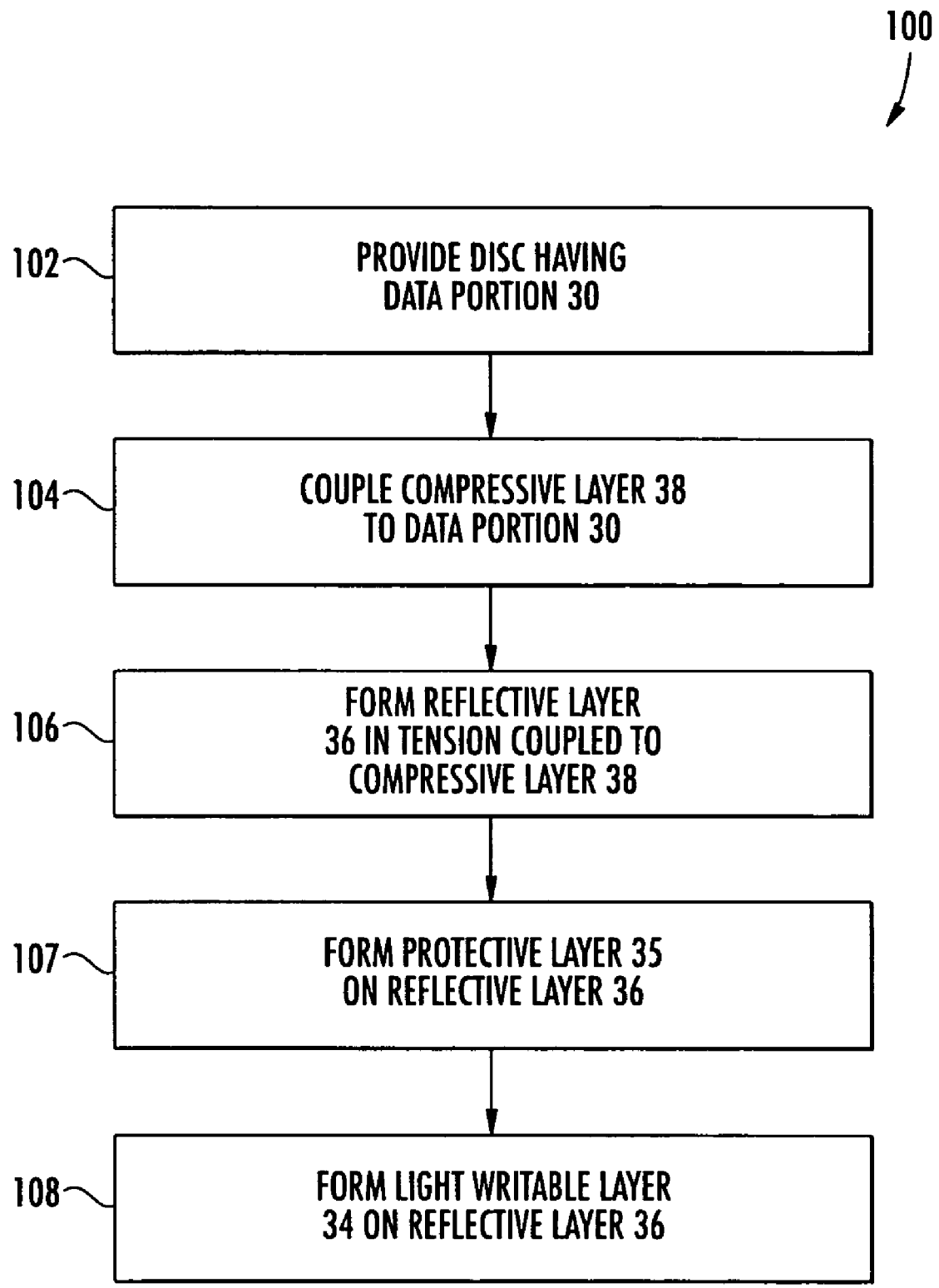
FIG. 3 is a flow diagram of one example method for forming the disc of FIG. 1 according to an example embodiment.

FIG. 3 is a flow diagram illustrating one example method 100 for forming a disc, such as disc 20, configured to store data and additionally configured to have a label written upon it by one or more electromagnetic writing devices, such as a laser. As indicated by step 102, a disc having a data portion 30 is initially provided. Such a disc may comprise a writeable data disc configured to have data written upon it by an electromagnetic radiation source or may comprise a disc having preconfigured set of fixed data such as a disc including grooves or pits formed in a data layer representing such data. According to one embodiment, the disc having the data portion 30 has a radial tilt within desired specifications, such as within 0.7 degrees. Although not illustrated, method 100 may additionally include steps for forming such a disc.

As indicated by step 104, a compressive layer, such as compressive layer 38 shown in FIG. 2, is coupled to the data portion 30. Compressive layer 38 comprises one or more materials, which when deposited according to a selected deposition process, and upon curing or solidifying, are in a state of compression. Examples of such materials include Ta, Ti, Zirconium, $Al_2O_3$, $SiO_2$, $TiO_2$. According to one embodiment, the compressive layer 138 may be sputter coated or deposited by vapor deposition upon the data portion 30, such as data portion 30. In other embodiments, other materials another deposition processes may be used.

As indicated by step 106, reflective layer, such as layer 36 shown in FIG. 2, is coupled to compressive layer 38. In one embodiment, the reflective layer 36 is deposited directly upon compression layer 38 so as to adhere to compression layer 38. Reflective layer 36 comprises one or more materials which when deposited in according to a selected deposition process, and upon curing or solidifying, provide high levels of reflectivity of visible light. Examples of such materials include silver and aluminum. Upon solidifying or curing, such materials are in a state of tension. However, as noted above, the resulting tension exerted upon data portion 30 by reflective layer 36 is reduced or at least partially countered by the compression provided by layer 38.

As indicated by step 107, protective layer 35 is formed upon reflective layer 36. Protective layer 35 protects reflective layer 36 from environmental conditions such as humidity or moisture. In one embodiment, protective layer 35 is formed by spin coating a CD lacquer upon reflective layer 36 and curing the lacquer to at least partially encapsulate layer 36. Examples of UV-curable lacquers include Daicure SD2200 or SD2407 by Dainippon Ink or Desolite 650-020, 650-030, 650-031, or 650-033 from DSM Desotech. In other embodiments, step 107 and layer 35 may be omitted where layer 34 additionally serves to protect reflective layer 36.

As indicated by step 108, a light writable layer, such as layer 34 shown and described with respect to FIG. 2, is formed on reflective layer 36. As noted above, layer 34 comprises one or more materials configured to change optical states upon being irradiated with light or electromagnetic energy such as infrared light, visible light or ultraviolet light. Layer 34 facilitates writing of labels to the disc. In particular, light passing through layer 34 is reflected by layer 36, providing an enhanced optical image or label.

In other embodiments, method 100 may include additional steps in which additional layers are formed. For example, additional transparent protective layer or film may be formed upon layer 34. Additional layers may also be formed between layer 38 and data portion 30. In some embodiment, some layers may be formed between layer 36 and 38 or additional transparent layers may be formed between layers 34 and 36.

Figure 4:
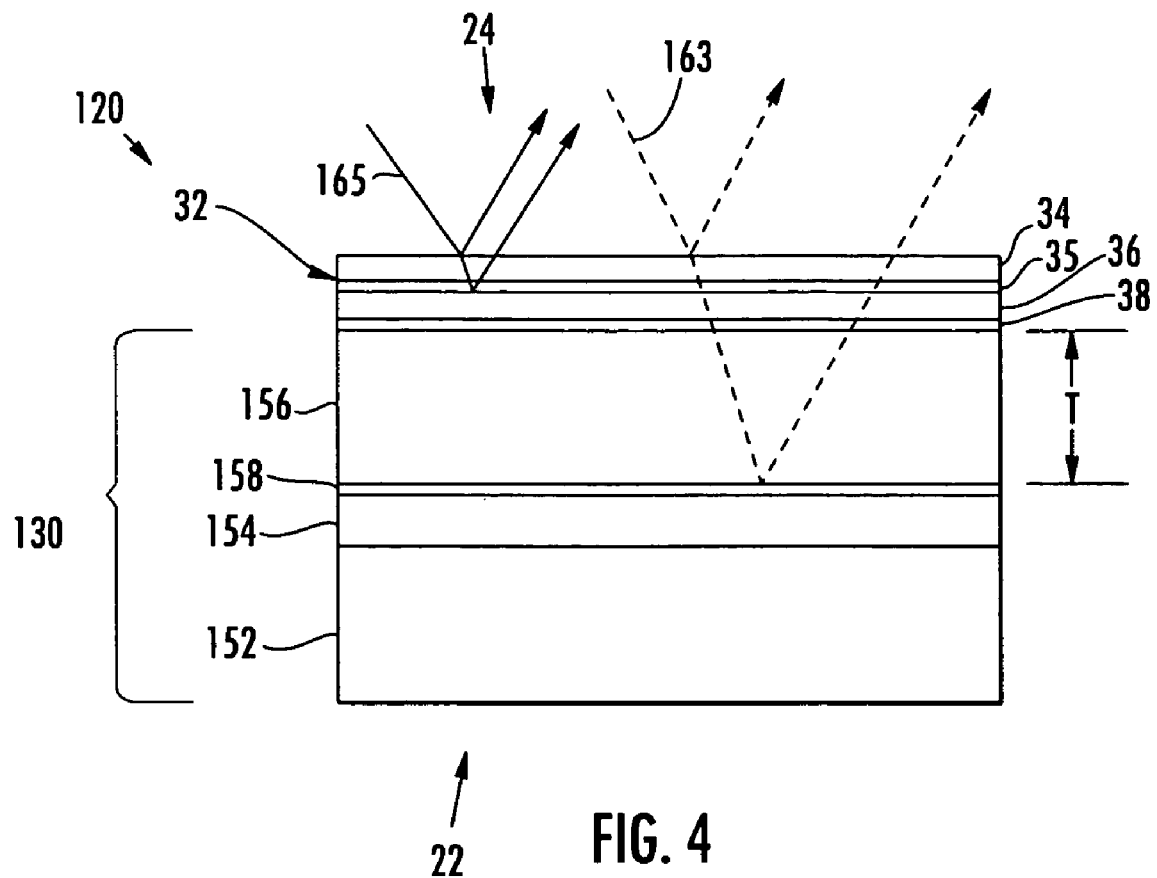
FIG. 4 is a sectional view of a portion of another embodiment of the storage disc of FIG. 1 according to an example embodiment.

FIG. 4 is a sectional view illustrating disc 120, another embodiment of disc 20. Disc 120 includes label portion 32 and data portion 130. Label portion 32 is described above with respect to disc 20. Data portion 130 is configured to facilitate the writing of data to disc 120 using a source of coherent light such as a laser. Data portion 130 includes substrate layer 152, data layer 154, substrate layer 156 and reflective layer 158.

Substrate layer 152 comprises a layer of transparent material configured to permit the transmission of coherent light there through to layers 154 and 158 and the reflection of light from layer 158 back through layer 152 for being read by a sensing device facing data side 22 of disc 120. According to one embodiment, layer 152 additionally serves as a base or supporting layer for layer 154 during fabrication of disc 120. According to one embodiment, layer 152 comprises polycarbonate. In other embodiments, layer 152 may be formed from other transparent materials.

Layer 154 comprises one or more layers of one or more materials configured to be written upon by electromagnetic energy, such as a laser. In particular, layer 154 is configured to be written upon with a laser so as to encode binary or other machine-readable data in layer 154. In one embodiment, such data is written in layer 154 along spiral grooves extending about a rotational axis of disc 120. In one embodiment, layer 154 comprises a layer or film of material which changes in optical characteristic upon being irradiated with a laser. Examples of such a material include a thermochromic or phase change material or other material configured to change between a light translucent state and a darkened light-absorbing or light-attenuating state in response to being irradiated by energy such as from a laser. In other embodiments, writable layer 154 may alternatively include other materials that change between different optical states upon being irradiated with a laser.

Substrate layer 156 comprises one or more layers of one or more materials spacing data layer 154 from label portion 32. In one embodiment, layer 156 further serves as a base or foundation layer upon which reflective layer 158 is formed during fabrication of disc 120. In one embodiment in which data portion 130 comprises a DVD, layer 156 has a thickness of about 600 μm. In another embodiment in which data portion 130 comprises a Blu-ray disc, layer 156 has a thickness T of about 1100 μm (1.1 millimeters). As a result, layer 34 is spaced from reflective layer 158 at least by thickness T. In one embodiment in which data portion 130 is configured to permit light to be reflected off reflective layer 158 from label side 24, such as when data portion 130 is configured to be used with the writable layer, such as layer 34 without a reflective layer, such as reflective layer 36, layer 156 is formed from a transparent material. According to one embodiment, layer 156 is formed from polycarbonate. In other embodiments, layer 156 may be formed from other transparent, translucent or opaque materials.

Reflective layer 158 comprises one or more layers of one or more reflective materials having sufficient reflectivities so as to reflect light that has passed through data layer 154 back towards an optical sensing device located opposite side 22 of disc 20. In one embodiment, layer 158 comprises a layer of one of more metals which are highly reflective such as silver or aluminum. In other embodiments, other reflective metals or nonmetals may be used.

According to one method of fabrication, layer 158 comprises a single film deposited upon substrate layer 156. Layer 154 comprises single layer of writeable material deposited upon substrate layer 152. Layers 156 and 158 and layers 152 and 154 are then stacked and joined to one another with layers 154 and 158 sandwiched between layers 152 and 156. In other embodiments, data portion 130 may be formed another ways.

FIG. 4 further illustrates label appearance benefits provided by layers 36 and 38. As indicated with broken lines 163, without reflective layer 36 which is closer to label side 24 than reflective layer 158, visible light is selectively attenuated by writable layer 34 to provide a label for disc 120. However, because the light travels across the thickness T of layer 156, which is substantial relative to the thickness of label portion 32, the light undergoes substantial refraction which may result in the label image being blurred. In contrast, as indicated with solid lines 165, with the addition of reflective layer 36 more proximate to label side 24, such refraction is greatly reduced, resulting in a more clear, distinct or sharp label image being seen by an observer. However, the addition of reflective layer 36 may add tensile forces, causing disc 120 to have excess radial tilt (bowing). As noted above, layer 38 at least partially compensates for the tension added by layer 36 by providing a compressive force. As a result, disc 120 has a radial tilt within desired specifications, such as less than 0.7 degrees.

Figure 5:
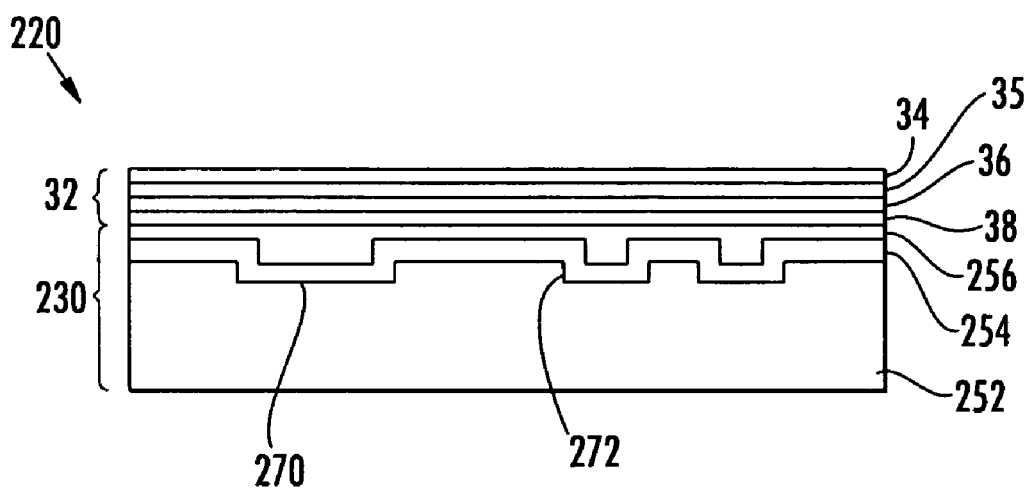
FIG. 5 is a sectional view of a portion of another embodiment of the storage disc of FIG. 1 according to an example embodiment.

FIG. 5 is a sectional view illustrating a portion of disc 220, another embodiment of disc 20. Disc 220 is similar to disc 120 except that disc 220 includes data portion 230 in lieu of data portion 130. The remaining components of disc 220 which correspond to components of disc 120 are numbered similarly. Data portion 230 includes substrate layer 252, data layer 254 and substrate layer 256. Layers 252, 254 and 256 cooperate to provide a fixed set of data that may be read from disc to 20. Substrate layer 252 comprises a layer of transparent material configured to permit light, such as laser light, to pass therethrough and to be reflected by layer 254. In one embodiment, such a layer 252 has a grooved or pitted surface 270 which defines the grooved or pits of data layer 254. In one embodiment, such grooves or pits are stamped or otherwise formed in layer 252. In yet other embodiments, surface 270 may be planar, wherein data layer 254 has varying thickness. In one embodiment, layer 252 comprises polycarbonate. In other embodiments, layer 252 may comprise one or more other materials.

Data layer 254 comprises one or more layers of reflective material coupled to layer 252. In one embodiment, data layer 254 comprises a layer of film of material such as aluminum or silver. In other embodiments, layer 254 may be formed from other reflective materials.

As shown by FIG. 5, data layer 254 includes pits 272 which form elevated and depressed portions which reflect light differently, wherein the different reflection of light by layer 254 corresponds to data stored in data layer 254.

Layer 256 comprises a layer of material spacing a remainder of data portion 230 from label portion 32. In one embodiment, layer 256 comprises a layer of acrylic formed upon reflective layer 256. In other embodiments, layer 256 may comprise one or more other materials.

With respect to disc 220, label portion 32 facilitates the addition of customized labels to a disc having a fabricated or fixed set of data by an end user using a writeable disc drive. Because label portion 32 does not substantially increase radial tilt, label portion 32 may be added to an existing disc including data portion 230 without substantial changing of the process by which data portion 230 is itself fabricated. Reflective layer 34 provides enhanced reflection of light which facilitates viewing of the label written upon writable layer 34. As the same time, compressive layer 38 at least partially counters tensile forces of reflective layer 36 to reduce excess radial tilt.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompasses a plurality of such particular elements.

What is claimed is:

1. A storage disc comprising:
a data portion;
a first reflective layer in tension and coupled to the data portion;
a writable layer on a first side of the first reflective layer and configured to be written upon with electromagnetic energy; and
a first compressive layer on a second side of the first reflective layer, the first compressive layer exerting a compressive force on the first reflective layer, wherein the data portion comprises:
a first transparent layer;
a data layer between the first transparent layer and the compressive layer; and
a second layer between the data layer and the compressive layer.

2. The storage disc of claim 1, wherein the data portion includes a data layer.

3. The storage disc of claim 2, wherein the data layer is configured to be written upon with electromagnetic energy.

4. The storage disc of claim 2, wherein the data layer includes pits and lands representing data.

5. The storage disc of claim 1, wherein the first reflective layer is in a first magnitude of tension and wherein the compressive force has a second magnitude within a range of 100 Mpa of the first magnitude.

6. The storage disc of claim 1, wherein the first reflective layer is in a first magnitude of tension and wherein the compressive force has a second magnitude substantially equal to the first magnitude.

7. The storage disc of claim 1, wherein the data portion includes a second reflective layer and wherein the writable layer is spaced from the second reflective layer by at least about 600 micrometers.

8. The storage disc of claim 1, wherein the data portion includes a second reflective layer and wherein the writable layer is spaced from the second reflective layer by at least about 1100 micrometers.

9. The storage disc of claim 1 wherein the second layer is transparent.

10. The storage disc of claim 1, wherein the second layer comprises polycarbonate.

11. The storage disc of claim 1, wherein the compressive layer is adhered to the first reflective layer.

12. The storage disc of claim 1, wherein the compressive layer selected from a group of materials consisting of: Ta, Ti, Zirconium, $Al_2O_3$, $SiO_2$, $TiO_2$.

13. The storage disc of claim 1 further comprising a translucent protective coating on an opposite side of the writable layer as the first reflective layer.

14. The storage disc of claim 1, wherein the compressive layer has a thickness of between about 50 Angstroms and about 600 Angstroms.

15. A method comprising:
forming a first reflective layer in tension on a storage disc having a data portion;
forming a writable layer on the reflective layer, the writable layer configured to be written upon with electromagnetic radiation;
forming one or more compressive layers having a collective compressive stress of a magnitude to reduce radial tilt caused by the first reflective layer; and
forming a data portion comprising a first transparent layer, a data layer between the first transparent layer and the one or more compressive layers and a second layer between the data layer and the one or more compressive layers.

16. The method of claim 15, wherein the data portion includes a second reflective layer and wherein the one or more compressive layers are formed between the first reflective layer and the second reflective layer.

17. The method of claim 15, wherein the one or more compressive layers are formed from one or more materials selected from a group of materials consisting of: Ta, Ti, Zirconium, $Al_2O_3$, $SiO_2$, $TiO_2$.

18. The method of claim 15, wherein the second layer is transparent.

19. The method of claim 15, wherein the second layer comprises polycarbonate.

20. The storage disc of claim 1, wherein the first compressive layer contacts the second layer.

21. The storage disc of claim 1 further comprising a second reflective layer on an opposite side of the first reflective layer of the data layer and spaced from the first reflective layer, wherein the data layer comprises a laser writable layer on an opposite side of the second reflective layer as the data layer and proximate a side of the disc, wherein the side of the disc has a radial tilt of less than or equal to about 0.7 degrees.

* * * * *